United States Patent [19]

Price et al.

[11] 4,366,641

[45] Jan. 4, 1983

[54] FISHING LURE CONTAINER AND TRANSPORTER

[76] Inventors: Robert E. Price, 706 W. Buckingham, Chicago, Ill. 60657; Lawrence S. Suss, 3306 W. North Shore, Lincolnwood, Ill. 60645

[21] Appl. No.: 218,734

[22] Filed: Dec. 22, 1980

[51] Int. Cl.³ .............................................. A01K 97/06
[52] U.S. Cl. .................................. 43/54.5 R; 220/21; 224/920
[58] Field of Search .............. 43/54.5, 57.5; 206/226, 206/243, 315 R; 220/21; 224/103, 148, 920, 921, 922; 229/93

[56] References Cited

U.S. PATENT DOCUMENTS 2,783,875  3/1957  Shabarick ..................... 43/54.5 R
3,159,441  12/1964  Sikma ........................ 43/54.5 R X Primary Examiner—Nicholas P. Godici
Assistant Examiner—M. Jordan
Attorney, Agent, or Firm—Joyce R. Niblack

[57] ABSTRACT

A novel lure caddy is provided which allows for the transport, display, selection, handling and storage of fishing lures and other tackle. The lure container comprises a core, a plurality of lure compartments associated with said core, means for selectively removing a lure from said container without exposing the hooks of other lures, and means for rotatably mounting said container to a carrier. A novel snap hook is also provided.

5 Claims, 15 Drawing Figures

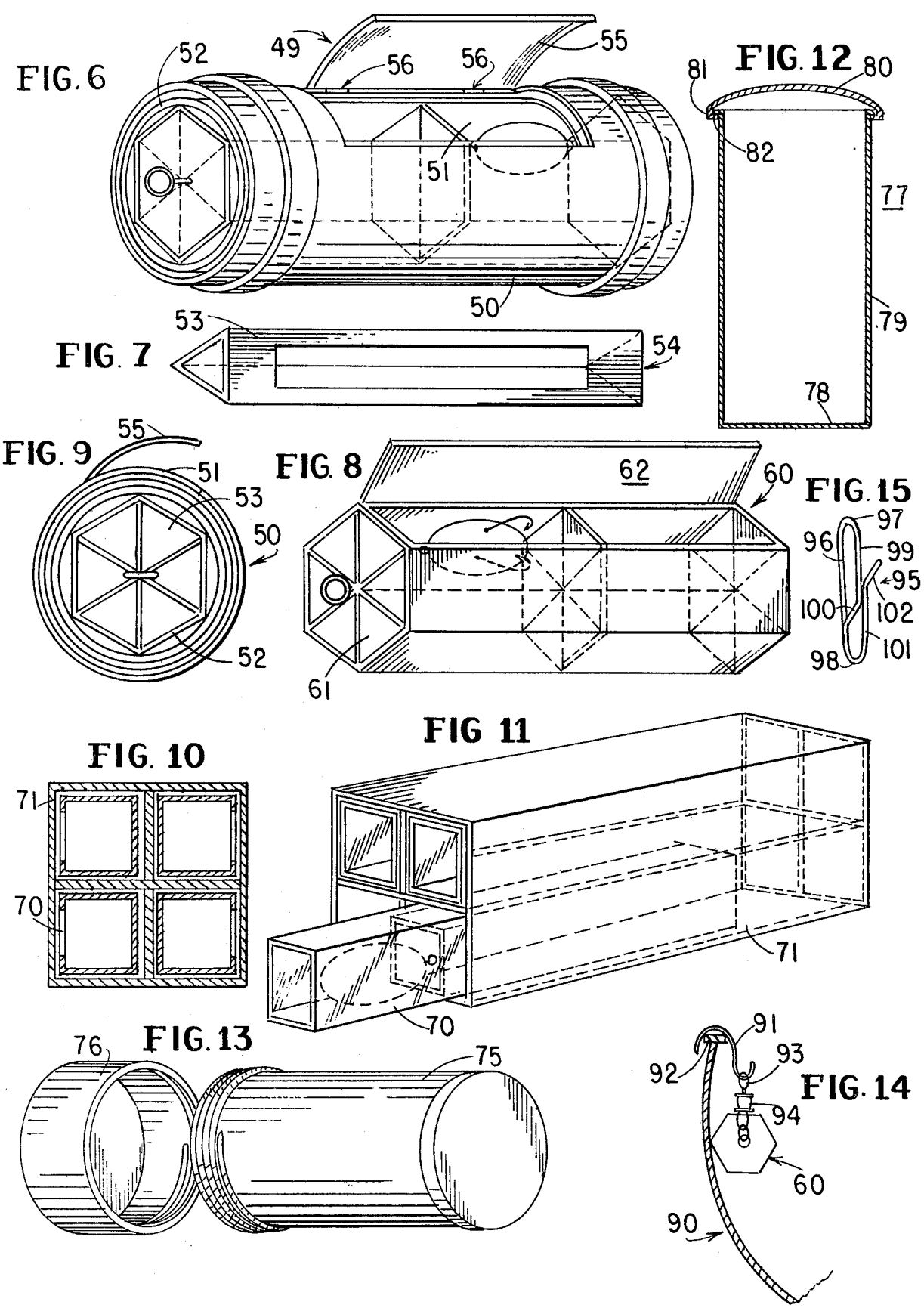

FISHING LURE CONTAINER AND TRANSPORTER

Fishing lures are conventionally stored and transported in tackle boxes. Generally, the tackle boxes have a plurality of open compartments adapted to receive fishing lures, hooks, weights, bobbers, etc. While conventional tackle boxes vary in size, they present a problem because of the exposed hooks of fishing lures. As all fisherman know, unless properly housed, the hooks associated with lures can either become tangled with the hooks from other lures or with fishing line or other equipment stored in the tackle box. This problem becomes acute when the box is being transported and the contents can be jostled during transport. Further, the exposed hooks can lead to injury to the fisherman when reaching for a lure or trying to untangle a lure from other equipment in the tackle box.

A number of approaches have been tried to improve the problem of lure storage and transport when using conventional tackle boxes. Often, lures are stored in individual containers, to lessen the problem.

However, the individual container approach does not provide a satisfactory solution to the fisherman who wants to take only a part of his tackle with him and desires a light weight, safe, convenient means of transporting, displaying and holding his lures and other tackle needed only for a particular trip.

A further problem with conventional tackle boxes resides in their limited portability once the fisherman is fishing, and the danger that, in the case of fishing from a pier in the face of waves, the tackle box can be washed into the water and substantial equipment lost.

There have been various attempts to provide a solution to the above problems. See, for example, U.S. Pat. Nos. 3,832,798; 3,350,810; 2,862,853; 2,813,368; 2,729,913; 2,675,640; 3,180,053; 3,166,866; 2,693,662; and 1,624,233.

The present invention provides an improved lure container which is light weight, provides a safe, convenient means for selecting and removing the desired lure and which can be either worn on the body of a fisherman or attached to the side of a boat.

The advantages of the lure caddy of the present invention will be more fully understood from the following description, taken in conjuction with the accompanying drawings in which:

FIG. 6 is a perspective view of a second embodiment of a lure caddy having a central, rotating core.

FIG. 7 is a perpective view of an inner lure compartment for a caddy having a central, rotating core.

FIG. 8 is a cross-sectional view of six fixed storage compartments, each having independent openings in the outer housing.

FIG. 9 is a side view of a storage container.

FIG. 10 is a side view of the caddy of FIG. 11.

FIG. 11 is a cross-sectional view of a third embodiment of a lure caddy of the present invention.

FIG. 12 is a side view of the caddy of FIG. 11.

FIG. 13 is a perspective view of a storage compartment adapted to fit on the end of the caddy of FIG. 1.

FIG. 14 is an end view of the caddy of FIG. 1 attached to the side of a boat.

FIG. 15 is a side view of an improved snap hook.

Figure 1:
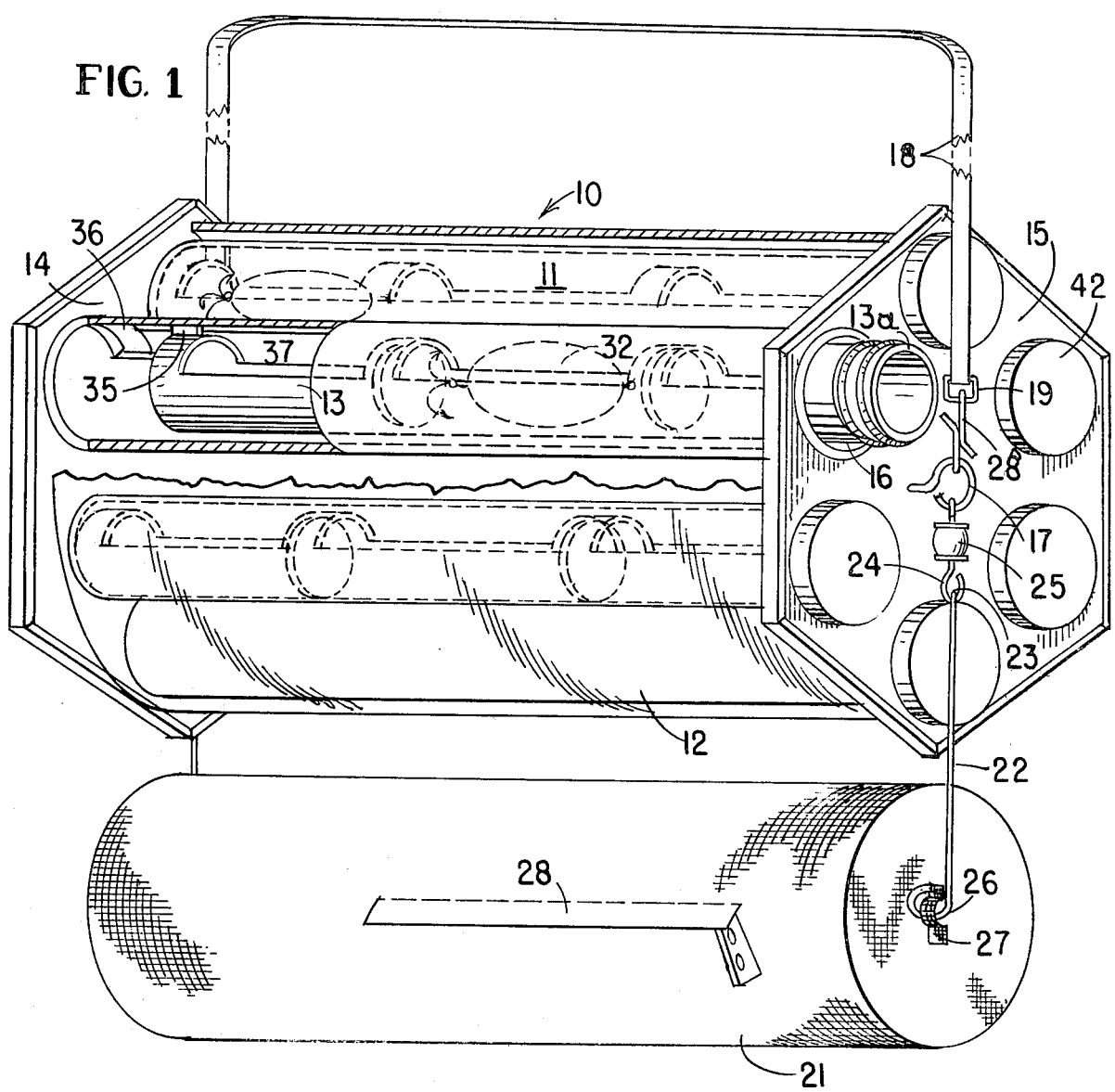
FIG. 1 is a perspective view of the preferred embodiment of the lure caddy of the present invention with an accompanying tote bag.
Figure 2:
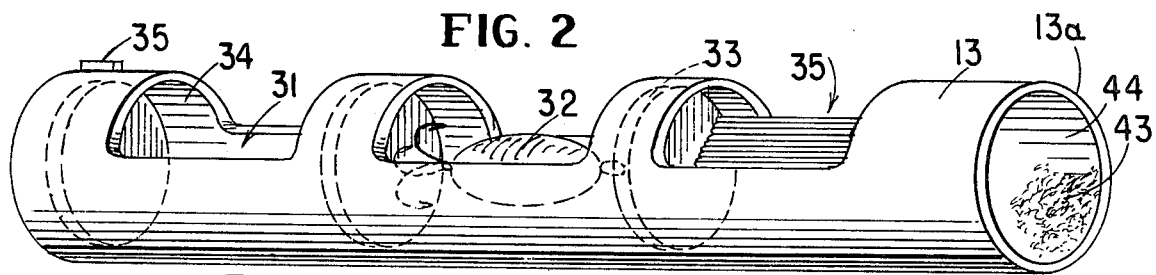
FIG. 2 is a perspective view of one embodiment of an inner tube adapted to contain a plurality of fishing lures.

Generally speaking, the lure caddy of the present invention comprises a core having a plurality of lure compartments associated with said core. Means for selectively removing a lure from the caddy without exposing the hooks of other lures contained therein and means for rotatably mounting the caddy to a carrier are also associated with the lure container.

The core can be either a housing having a plurality of tubular compartments formed about the longitudinal central axis of the housing and which receive inner tubes having lure compartments defined by openings along one longitudinal segment of the tube and separator walls which are disposed at predetermined intervals along the length of the tube to form compartments having an opening to receive a lure. To insert and remove lures, the inner tube is simply slidably inserted and removed from the core tube.

Alternatively, the core can be a rotatable core comprising a plurality of fixed, elongated hollow members having compartments formed therein which are placed in a housing having an opening with a lid in the side wall. To insert or remove a lure, the core is rotated until the desired lure compartment is aligned with the opening in the housing, the opening lid is opened and the lure inserted or removed.

As another alternative, the lure compartments can form both the core and the housing, with each lure compartment having its own, hinged lid for lure removal.

While it is preferred to have a housing with a plurality of tubular compartments to receive the lure-containing inner compartmentalized tubes, any of the above-described embodiments will provide a satisfactory solution to the problems associated with the storage, display and transport of fishing lures and other fishing tackle.

It is critical, however, that the core be associated with means for rotatably mounting the container on a carrier. The carrier may be a fisherman who wears the lure caddy, using a shoulder strap attached at each end of the container so that the caddy can be freely rotated to align the desired lure-containing tube at the top of the container for easy display and removal by the fisherman.

Alternatively, the carrier can be mounted on a side rail of a boat by replacing the strap with appropriate hooks at either end of the container.

Either the straps or the hooks may be used to mount the rotatable container on a branch of a tree or bush, or to an appropriate portion of a pier or other suitable object adjacent the fishing site.

To provide a rotating core, an appropriate combination of connector means are employed. It will be apparent to those skilled in the art that a barrel swivel or an equivalent hook means can be employed to effect rotation of the container.

In that connection, one aspect of the present invention provides a novel hook means which can be used in place of a conventional snap hook device. The novel hook means comprises a single wire member in the form of a substantially closed loop, said clip member defined by an open throat portion having offset, inwardly and outwardly positioned deflection members.

Turning now to the drawings, lure caddy 10 comprises circular housing 11 having a plurality of integrally formed, tubular compartments 12 adapted to slidably receive inner tube 13. Housing 11 and tube 13 are preferably of a clear material so that the lures and other tackle stored in the caddy are readily displayed to facilitate selection of the desired lure, etc. Housing 11 has closed end plate 14 and open end plate 15. End plate 15 has a plurality of holes 16 to permit insertion and removal of inner tubes 13. Mounting means 17, such as an eye hook, is centrally affixed to the outer surfaces of end plates 14 and 15. If the caddy is to be worn by the fisherman, strap 18 is removably attached to mounting means 17 by swivel hook means 19 and snap closure means 20 which allow caddy 10 to rotate about the central axis while carried on the fisherman's body, hooked over a tree limb, etc.

If additional carrying space is desired, tote bag 21 is hung from mounting means 17 by hanger 22. The upper end of hanger 22 is attached to a bottom hook means 24 of swivel connector 25. The lower end 26 of hanger 22 is affixed to tab 27 of tote bag 21. Bag 21 has closure means 28 which, in the preferred embodiment is a zipper.

Tube 13 comprises a plurality of compartments 31 adapted to house lure 32. Wall 33 and opening 34 define the size of each comparment which can be varied depending upon the size of the lure to be contained therein.

It will be apparent that tackle other than lures can also be transported, stored and displayed in the caddy of the present invention, such as fishing line 35.

Tube 13 has tooth 35 which lockably engages slot 36 in compartment 12. To slide tube 13 in and out of compartment 12, tooth 35 must be aligned with longitudinal groove 37 in compartment 12.

Figure 3:
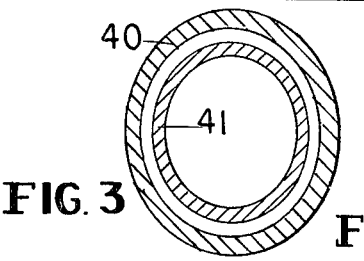
FIG. 3 is an end view of an outer housing tube and an inner tube in alignment for withdrawal of the inner tube.
Figures 4, 5:
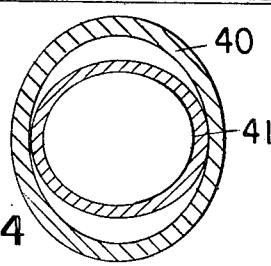
FIG. 4 is an end view of an outer housing tube and an inner tube out of alignment for locking of the inner tube via cam action.
FIG. 5 is an end view of an outer tube and an inner tube out of alignment for locking of the inner tube via lock and key means.

Alternatively, tube 13 can be locked within compartment 12 via a camming action as shown in FIGS. 3 and 4. Referring to FIG. 3, outer tube 40 houses inner, eccentric tube 41 which is out of alignment for locking via cam action. In this positions, tube 41 can be readily moved in and out of outer tube 40. Tube 41 is locked within housing tube 40, as shown in FIG. 4, by twisting tube 41 within tube 40 until tube 40 is lockably engaged therein.

Inner tube 13 is also provided with grasping means for removing and locking the tube within the housing tube. Grasping means can be end cap 42 which is affixed to end 13a of tube 13 or roughened surface 43 in side wall 44 of tube 13, adjacent to end 13a.

Locking means 35 and 36 or locking via a cam action insure that tube 13 and 41 remain in place when the unit is not in use, is being transported or carried on the body of a fisherman, and further insures that the tube is properly oriented when withdrawn from its housing to safely remove the desired lure.

In an alternative embodiment, as shown in FIG. 6, lure caddy 49 comprises housing 50 having opening 51 in the upper central portion thereof. Rotating core 52 is rotatably contained within housing 50. Core 52 ccomprises a plurality of lure containing units 53. Each unit 53 has an opening 54 which, when aligned with opening 51 of housing 50, permits removal of the lure exposed in the opening. Cover 55 is affixed to housing 50 adjacent one longitudinal edge of opening 51 by hinge means 56.

In a further embodiment, lure container 60 comprises a plurality of fixed, joined tubes 61, which are conveniently, for a hexagonal configuration, elongated, triangular-shaped tubes. Tubes 61 are joined together so as to form both the housing and lure container. Each tube has its own lid 62 which is raised to expose and remove the desired lure or lures. Each tube 61 can have compartments of varying size depending upon the size of the lures to be transported and stored therein.

As shown in FIGS. 10 and 11, the lure-containing tubes 70 and housing 71 can alternatively be rectangular, instead of circular, eliptical or triangular. Regardless of the shape of the tubes, the tubes can be removable from the housing, from an intergral, rotatable core, or be joined together to form both the housing and the lure containers.

The preferred embodiments are depicted in FIGS. 1–5.

If additional storage space is desired, the closed end of container 75 can be threaded to receive end storage unit 76.

In the case of caddies 49 and 60, outer case 77 may be provided for storage and transport. Case 77 comprises end wall 78, hollow body 79 which conforms to the shape of the caddy and is large enough to house the caddy and removable cap 80. Cap 80 has flange means 81 which snap over lip 82 of container 77.

Normally, the lure caddy of the present invention is conveniently worn by the fisherman, using strap 18 as a shoulder strap. However, the caddy can also be rotatably mounted on the side of a boat as shown in FIG. 14. In FIG. 14, strap 18 has been removed and hook means 91 affixed to mounting means 17 on each end plate. One end of hook means 91 are placed over the boat railing 92 and the other end is attached to upper hook 93 of barrel swivel 94.

The advantages of the lure caddy of the present invention should now be apparent to those skilled in the art. In addition to the ease of transport and selection of the desired lures, the safety afforded in lure transport, storage and handling, the convenience of the caddy, lures and other tackle transported and stored in the lure caddy of the present invention are securely housed in individual compartments and kept separate and apart. Accidental splillage has been eliminated, and, if the lure caddy is accidentally dropped in the water, it will float for the brief period of time needed to retrieve it.

In addition to the lure caddy, another aspect of this invention provides an improved snap hook 95, shown in FIG. 15. Snap hook 95 can be stored with a plurality of other similar hooks without tangling. Hook 95 comprises a first, elongated leg 95 which terminates at each end in u-shaped bends and 98. Leg 99 extends from u-shaped bend 97 and terminates in arm 100 which is bent inwardly toward leg 95. Leg 101 extends from u-shaped bend 98 until it abuts with leg 99. Leg 101 terminates in arm 102 which is bent at an angle outward from leg 98 and in the opposite direction of arm 100.

Hook 95 is preferably formed from a continuous flexible wire for applications such as for use in the strap-fastening assembly of the present invention. However, hook 95 can be of any shape so long as it comprises a single, resilient wire member in the form of a substantilly closed loop, and is defined by an open throat portion having offset, inwardly and outwardly positioned deflection members 100 and 102.

Having thus defined our invention, we claim:

1. A fishing lure container comprising a core, a plurality of lure compartments associated with said core, means for selectively removing a lure from said container without exposing the hooks of the other lures contained therein to the fingers of a fisherman, and means for rotatably mounting said container to a carrier and wherein said core is an elongated housing having a first end plate and a second end plate, said first end plate having a plurality of openings, said housing further comprising a plurality of integrally formed, tubular compartments having one open end which is in alignment with an opening in said first end plate, and wherein said lure compartments comprise elongated tubes adapted to be slidably received within said tubular compartments of said housing.

2. The lure container of claim 1 wherein said elongated tube has a first compartment, said compartment having an opening in one wall thereof to permit placement and removal of a lure therefrom, the abutting wall of said tubular compartment housing said lure containing tube providing a cover for said opening while said tube is in place in said compartment.

3. The lure container of claim 2 additionally comprising means for locking said tube within said housing.

4. The lure container of claim 3 wherein said inner tube is eccentric so as to provide a cam locking means with said compartment.

5. The lure container of claim 4 wherein said locking means comprises a tongue member on said inner tube end and a groove in said compartment, and wherein said compartment further comprises an elongated groove along the longitudinal axis thereof for orientation of said inner tube for insertion and removal thereof.

* * * * *